Patented Aug. 19, 1952

2,607,766

UNITED STATES PATENT OFFICE 2,607,766

LACTALBUMIN PURIFICATION

James D. Ingle and Raymond T. Stahl, Chicago, Ill., assignors to Swift & Company, Chicago, Ill., a corporation of Illinois No Drawing. Application May 23, 1949,
Serial No. 94,926

3 Claims. (Cl. 260—122)

The present invention relates to the treatment of lactalbumin and more particularly to a method of purifying lactalbumin.

Milk albumin or lactalbumin is a valuable protein ingredient in whey obtained from cheese manufacture. Many methods have heretofore been proposed in the prior art for the recovery of lactalbumin from whey. However, one of the primary disadvantages of the existing methods for the recovery of lactalbumin from whey is the fact that the lactalbumin so recovered is impure and hence whey is generally used as an animal feed rather than as a source of lactalbumin. Crude lactalbumin as precipitated from whey always contains varying amounts of water-insoluble salts, such as insoluble calcium and magnesium phosphates, most of which are colloidal in nature. The prior art has relied on washing the precipitated lactalbumin containing such salts as impurities with plain water to effect purification thereof. Since the salts are water-insoluble, such washes have been ineffective in removing any but a very small percentage of the impurities contained in the lactalbumin.

Therefore, it is an object of the present invention to provide a method for purifying lactalbumin containing water-insoluble impurities.

It is a further object of this invention to provide a method for treating lactalbumin derived from whey to effect a purification thereof.

An additional object of the present invention is to provide an inexpensive and highly effective method of solubilizing and removing water-insoluble impurities from lactalbumin.

Additional objects, if not specifically pointed out herein, will be apparent to one skilled in the art from the following detailed description of the present invention:

Generally, this invention comprises treating lactalbumin having water-insoluble salts as impurities therein with an acid wash water to solubilize said impurities and removing such solubilized impurities from the lactalbumin by draining, washing, or the like.

Specific applications of the present invention will be hereinafter disclosed. The method of purification as set forth by this invention is of particular value in the purification of lactalbumin derived from cheese whey, but finds equal application to the purification of lactalbumin derived from any source, such as from albuminous solutions obtained from milk, skimmed milk, buttermilk, or the like, provided such lactalbumin contains as impurities any water-insoluble salts or the like.

The method of purifying lactalbumin which forms the present invention as pointed out above is particularly valuable when applied to the purification of lactalbumin derived from whey. The treatment of the whey to precipitate the lactalbumin therefrom does not form part of the present invention, but for the sake of clarity a brief description of the prior art methods of obtaining lactalbumin from whey follows.

Lactalbumin may be obtained from whey by the saturation thereof with certain salts followed by dilution, acidulation, and, finally, long standing, to effect crystallization. Another method of recovering lactalbumin from whey is to coagulate the lactalbumin by means of heat. Lactalbumin may also be obtained from whey by precipitation with acid and heat. The crude lactalbumin as obtained by the above methods may be satisfactorily treated by the method of the present invention to effect purification thereof. However, it has been found that the greatest ease of operation and the most efficient purification are obtained by applying the method of this invention to the purification of lactalbumin which has been obtained in the following manner: Starting with cheese whey, a sodium alkali is added to produce a pH of approximately 6.9. The whey is then heated to 190° F. and at that temperature sufficient acid is added to drop the pH sharply to a value between about pH4 to pH5. An almost instaneous precipitation of the lactalbumin takes place, forming large curds which float on top of the vat and which may be recovered by skimming and draining. The crude lactalbumin is then placed in cans for freezing, after which it is thawed and crushed and is then in the preferred condition to be treated by the method of the present invention.

At this point the protein still contains the water-insoluble salts which precipitated out with it. Part of the said salts is in a soluble state due to the acid treatment in the above-described precipitation step. However, when the conventional water wash is applied to the crude lactalbumin, only a very small amount of these salts is thereby removed. This is primarily because the pH of the material is rapidly raised to the point at which the said salts become insoluble and hence they are not removed by this treatment.

It has been found that by the use of an acid wash water in place of the conventional water wash, most, if not all, of the colloidal, water-insoluble salts will be solubilized so that they may be removed by draining. In the preferred method of so purifying the protein, the lactalbumin, having been frozen, thawed, and crushed, is treated with acid water of pH below 5.0 at a temperature of approximately 100°–170° F. The slurry so formed is stirred and allowed to settle for a short time. The acid wash water, now containing the solubilized salts, may be removed from the protein by draining.

The pH of the acid wash water should be in the range of pH2 to pH5, with best results being obtained at a pH of about 4.5 whereat the rate of penetration of the wash water is the greatest since it is very close to the isoelectric point of the lactalbumin at which point the protein has the least attraction for water. At a pH of below 2, the protein product is apt to be adversely affected, while if a higher pH than 5 is used the insoluble salts will not become solubilized. Any suitable acid may be used to form the acid wash water, but acids that do not form insoluble calcium or magnesium salts are, of course, preferred. Hydrochloric acid, for example, is highly suitable for use in the present method.

The temperature at which the acid wash is used should be in the range of 100° F. to 170° F. with the preferred range being from 140° F. to 170° F. Higher temperatures may be used since the dissolving action is greater at the higher temperatures, but the ranges indicated herein have been found to be most satisfactory.

An example of the degree of purification accomplished by the method of this invention is indicated below:

Crude lactalbumin was tested for ash content. On the dry basis the sample was found to contain 6.1% ash. Upon washing the lactalbumin with an acid wash water of pH3 at a temperature of 170° F. for a period of 5 minutes, draining the acid wash water, and washing with plain water at 170° F., the sample tested indicated a total ash content of 2.2% on the dry basis. This reduction in ash content, approximately 64%, indicates the substantial purification effected by the method of the present invention.

As indicated above, it is preferred to apply the present method of purification to lactalbumin obtained by a particular method. The reason for such preference may be easily seen. In the preferred method of obtaining lactalbumin, the protein has been destabilized by the freezing step indicated therein. Such destabilization results in a physical change in the structure of crude lactalbumin, the destabilized lactalbumin having a coarser, less jelly-like structure than similar protein which is not destabilized. This coarser structure permits a more free penetration of the wash water and offers more rapid draining. In addition, the freezing seems to reduce the water-holding capacity of the flocculated protein so that it may be more easily washed and drained.

It is to be noted that although the lactalbumin may have a pH of below 5.0 as a result of the use of acid in the precipitation step, such salts as are solubilized at that time are not readily removable from the protein since the lactalbumin flock at the time of precipitation is a sponge or jelly-like mass which contains an enormous amount of whey. Even after draining as completely as possible, the solids content only runs between 15 and 20 per cent. The other 80 to 85 per cent is whey which contains lactose and insoluble salts. Although some of these salts are solubilized by the precipitation in acid solution, they cannot be washed out of the protein due to the extremely slow rate of movement of water in and out of the material. However, after freezing, the structure of the protein is so changed that washing becomes more feasible. If plain water is used for this washing process, the pH of the material is soon raised to the point where the salts are insoluble and hence they are not washed out. However, if an acid wash of pH5 or less is used, the salts are retained in the solution and washed out. After the salts have been washed out, the remaining traces of acid may be removed through washing with plain water, if so desired.

It is believed that the foregoing method as set forth and described herein constitutes a definite advancement and improvement in the art of purifying lactalbumin, obtained from whey or other sources, containing water-insoluble salts as impurities therein.

We claim:

1. A method for purifying lactalbumin, which comprises: treating destabilized lactalbumin containing water-insoluble calcium and magnesium impurities with acidified water having a pH of from about 2.0 to about 5.0 at a temperature between 100° F. and 170° F. to solubilize the water-insoluble impurities contained in said lactalbumin, and removing said acidified water containing said solubilized impurities from said lactalbumin.

2. A method as in claim 1 wherein the temperature of the water is between 140° F. and 170° F.

3. A method of purifying destabilized lactalbumin containing water-insoluble calcium and magnesium impurities; which comprises: treating said destabilized lactalbumin with acid wash water having a pH of approximately 4.5 at a temperature between 140° F. and 170° F. to solubilize the impurities contained therein and thereafter, draining said acid wash water containing said solubilized impurities from the lactalbumin.

JAMES D. INGLE.
RAYMOND T. STAHL.

REFERENCES CITED

The following references are of record in the file of this patent:

UNITED STATES PATENTS

| Number | Name | Date |
|---|---|---|
| 2,278,670 | Rauer | Apr. 7, 1942 |
| 2,377,853 | Boyer et al. | June 12, 1945 |
| 2,423,773 | Hart et al. | July 8, 1947 |
| 2,468,730 | Block et al. | May 3, 1949 |
| 2,494,148 | Truce | Jan. 10, 1950 |
| 2,497,420 | Scott et al. | Feb. 14, 1950 |

OTHER REFERENCES

Northrop et al.: Jour. Gen. Physiol., vol. 11, pp. 477–479 (1928).